United States Patent [19]

Abu-Isa et al.

[11] Patent Number: 4,869,554
[45] Date of Patent: Sep. 26, 1989

[54] ELASTOMERIC WOVEN MAT SEAT SUSPENSION

[75] Inventors: Ismat A. Abu-Isa, Rochester Hills; Craig B. Jaynes, Bloomfield Hills, both of Mich.; Arthur L. Larson, Phoenix, Ariz.

[73] Assignee: General Motors Corporation, Detroit, Mich.

[21] Appl. No.: 194,979

[22] Filed: May 17, 1988

[51] Int. Cl.$^4$ ................................................ A47C 7/02
[52] U.S. Cl. .................................. 297/452; 297/441; 297/445; 5/187
[58] Field of Search ............... 297/441, 452, 457, 445; 5/187, 191, 194, 195

[56] References Cited

U.S. PATENT DOCUMENTS

| | | | |
|---|---|---|---|
| 237,535 | 2/1881 | Hunzinger | 297/452 |
| 552,840 | 1/1896 | Johnson | 297/452 |
| 1,038,083 | 9/1912 | Calef | 297/452 |
| 2,652,966 | 9/1953 | Griswold | 5/191 |
| 4,456,296 | 6/1984 | Rowland | 297/445 |
| 4,469,738 | 9/1984 | Himelreich, Jr. | 428/198 |
| 4,492,408 | 1/1985 | Lohr | 297/452 |
| 4,685,738 | 8/1987 | Tinus | 297/452 |

FOREIGN PATENT DOCUMENTS 985154 3/1976 Canada .............................. 297/457

Primary Examiner—Peter R. Brown
Assistant Examiner—Brian K. Green
Attorney, Agent, or Firm—William A. Schuetz

[57] ABSTRACT

A thin vehicle seat assembly having a tubular seat and back rest frame, seat and back rest cushion in the form of woven mats and means for attaching the mats to the seat and back rest frames. The woven mats comprise Hytrel elastomeric filaments extending perpendicular to each other and with the mats being prestretched in both directions to at least a 5–10% elongation prior to attachment to their respective frames.

3 Claims, 2 Drawing Sheets

ELASTOMERIC WOVEN MAT SEAT SUSPENSION

The present invention relates to a vehicle seat assembly and, more particularly, to a thin vehicle seat and/or back rest comprising a multiplicity of side by side elastomeric filaments woven into a mat and prestretched across spaced side frames.

Current production vehicle seats or seat assemblies usually contain bulky polyurethane stuffing material. This makes such seats relatively heavy and with a thickness such that little room is left beneath the seats or between the front and the rear seats. It has also been proposed to provide thin seats for vehicles, including thin seats using elastomeric seat backing material. For example, in Blair et al, U.S. Pat. No. 2,251,318, solid rubber tape or strips reinforced by fabric are stretched over a seat frame. As noted in the Blair et al patent, stretched elastomers have good properties for isolation and absorption of impacts and vibrations and readily deform to fit the shape of the body of the occupant they support.

A disadvantage of using conventional elastomers is that they have too low a modulus of elasticity. They will support a person comfortably under static conditions, but when a vehicle hits a bump or pothole they stretch causing the seat to deflect and bottom out and then rebound. This is presumably the reason the rubber strips in Blair et al were combined with fabric even though that lessens the ability of the strips to conform to the shape of the body of the occupant they support.

U.S. Pat. No. 4,545,614, assigned to the same assignee as the present invention, discloses providing a thin vehicle seat in which a multiplicity of side by side elastomeric filaments made from a block copolymer consisting of polytetramethylene terephthalate polyester and polytetramethylene ether are stretched across a vehicle seat frame. The elastomeric filaments had a diameter of between 0.2 and 2 mm and the material had a substantially higher modulus of elasticity at 100% elongation than natural rubber and was stretched across the frame in the range of 20–100% elongation, preferably 50% to 70% elongation in the seat and at least 20% elongation in the back rest. The individual elastomeric filaments conformed to the contour of the body of the occupant and provided a seat which is more comfortable and/or had better ride characteristics than if the elastomers were in the shape of natural rubber strips or the like.

While U.S. Pat. No. 4,545,614, discloses a vehicle seat which is extremely comfortable and highly acceptable, it nevertheless requires the use of filaments which have to be prestretched a substantial amount and then attached to a frame means, thus requiring a relatively sturdy frame means. In addition, the use of the filament does not lend itself for an automated method of making the seat.

In accordance with the provisions of the present invention, a relatively thin, light weight vehicle seat and/or back rest is provided in which elastomeric filaments made from the same kind of material as disclosed in U.S. Pat. No. 4,545,614, i.e., a block copolymer of polytetramethylene terephthalate polyester and polytetramethylene ether, such as that made by E. I. DuPont DeNemours Company and marketed under the registered trademark Hytrel, and having a substantially higher tensile strength and a substantially higher modulus of elasticity at 100% elongation than natural rubber are interlaced or woven to form a woven mat and thereafter prestretched to at least 10% elongation, if prestretched in both directions, or prestretched at least 20% elongation, if prestretched in only one direction, prior to being attached to a frame means to provide a seat or back rest which is at least as comfortable as conventional foam cushion seats currently being manufactured. This thin woven mat for a seat and/or back rest, besides being comfortable, can be readily attached to a frame means, this makes the seat assembly tight and amicable to automation.

Accordingly, it is a broad object of the present invention to provide a new and improved thin seat assembly for an automotive vehicle which comprises a frame means, preferably made from a light weight tubular material and including a seat frame and back rest frame for supporting a seat and back rest, respectively, and in which the seat and back rest each comprise a woven mat having first and second multiplicities of individual side by side elastomeric filaments extending perpendicular to each other and with each filament having an approximate diameter of 0.05 to 2 millimeters, preferably 0.5 millimeters, in which the mats are folded over along their side portions and adhesively bonded to one side thereof to define loops for receiving elongated members that extend therethrough, and in which the elastomeric filaments are made from a block copolymer consisting of polytetramethylene terephthalate polyester and polytetramethylene ether and have a modulus of elasticity at 100% elongation which is at least five times more than natural rubber, and wherein the first and second multiplicities of elastomeric filaments are prestretched to at least 5% elongation, when prestretched in both directions, or prestretched at least 10% elongation, if prestretched in only one direction, prior to attachment to the seat and backrest frame, and means connectable with the elongated members extending through the loops for respectively securing the seat and back rest woven mats after being prestretched to the adjacent sides of the seat and back rest frames of the frame means.

Yet another object of the present invention is to provide a new and improved seat assembly, as defined in the next preceding object, and in which the mats have their side positions defining the loops adhesively bonded by an adhesive means which is of a hot melt type comprising ethylene methacrylic acid ionomer or a blend of ethylene methacrylic acid ionomer, at a 10:1 ratio by acetate to ionomer.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the views and, in which.

Figure 2:
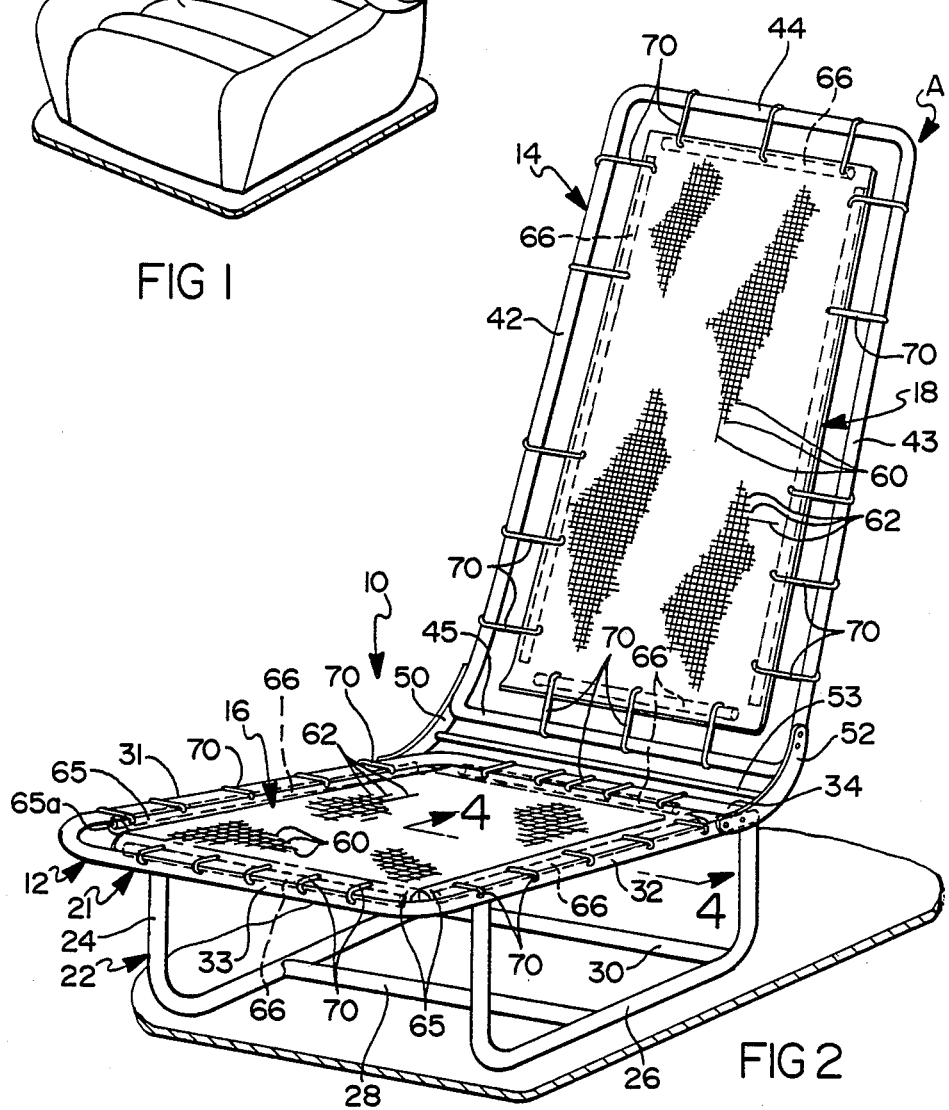
FIG. 2 is a front elevational view of the novel seat assembly of the present invention and showing a seat and back rest comprised of a woven mat attached to a frame means.
Figure 3:
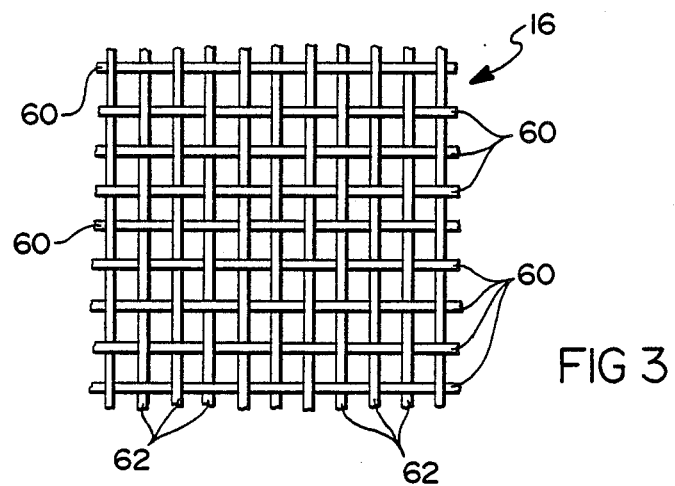
Figure 4:
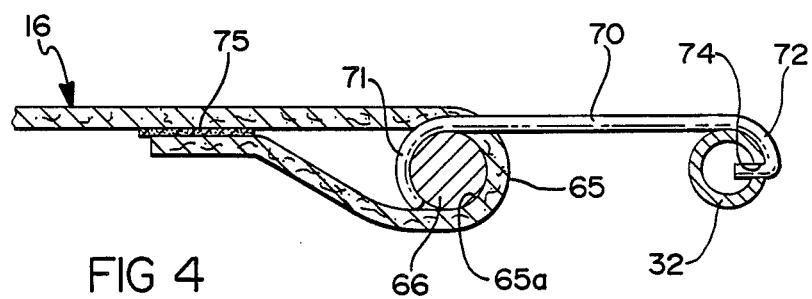

FIG. 3 an enlarged fragmentary plan view of a woven mat for the or back rest of the novel seat assembly shown in FIG. 2;

and FIG. 4 enlarged fragmentary sectional view taken approximately along lines 4—4 of FIG. 2.

Figure 1:
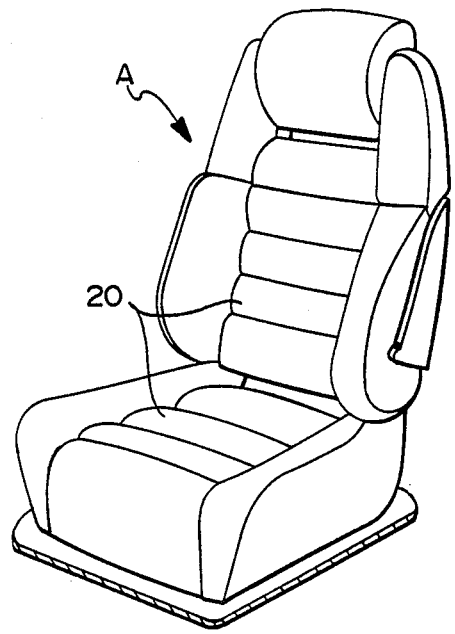
FIG. 1 is a perspective view of the novel seat assembly of the present invention and showing the same in a fashion.

Referring to FIGS. 1 and 2 of the drawings, a novel vehicle seat or seat assembly A is there shown. The seat assembly A comprises, in general, a frame means 10 including a seat frame 12 and a backrest frame 14, a seat cushion 16, a backrest cushion 18 and outer upholstery trim cover material 20 for covering the seat cushion 16, backrest cushion 18 and some of the frame means 10.

The seat frame 12 of the frame means 10 comprises upper and lower tubular seat frame sections 21 and 22. The lower frame section 22 comprises a pair of vertically disposed sides 24 and 26 and a pair of cross braces 28 and 30 which are suitably welded or otherwise secured together. The lower seat frame section 22 is adapted to be secured to a vehicle floor and can either be permanently mounted thereto or mounted on movable slides attached to the vehicle floor to enable the seat assembly A to be adjusted forward and rearward relative to the vehicle. The upper seat frame section 21 is generally rectangular or square shaped, as best shown in FIG. 2. The upper seat frame section 21 has left and right generally horizontal sides or side portions 31 and 32, a generally horizontal front side or side portion 33 and a generally horizontal rearward side or side portion 34. The left and right sides 31, 32 are adapted to be welded or otherwise suitably secured to the upper ends of the sides 24 and 26 of the lower seat frame section 22.

The frame means 10 also includes the back rest frame 14. The back rest frame 14 is generally rectangular in shape and comprises left and right, tubular generally vertical sides or side portions 42, 43 and top and bottom, tubular generally horizontal sides or side portions 44, 45. The back rest frame 14 adjacent its lower end, as viewed in FIG. 2, is suitably welded or otherwise secured the seat frame 12 via angle braces 50, 52 and a cross bar 53. The angle braces 50, 52 and cross bar 53 can either fixedly attach back rest frame 14 to the lower seat frame 12 by having the opposite ends of the angle braces 50, 52 welded to the seat and back frames 12, 14, as shown in the illustrated embodiment, or the angle braces 50, 52 can be pivoted to the seat frame 12 so as to allow limited pivotal movement of the backrest frame 14 relative to the seat frame 12, and in a manner well known and conventional in the art.

The upper seat frame section 21 of the seat frame 12 supports the seat cushion 16 and the backrest frame 14 supports the backrest cushion 18. Since the seat cushion 16 and the backrest cushion 18 are constructed in identical fashion, except for some differences noted hereinafter, only the seat cushion 16 will be described in detail and the same reference numerals will be applied to corresponding parts of the back rest cushion 18.

The seat cushion 16 comprises a woven mat which is adapted to be attached to the left and right sides 31, 32 and/or the front and rear sides 33, 34 of the upper seat frame section 21. The woven mat or seat cushion 16 comprises a first multiplicity of side by side elastomeric filaments 60 (see FIG. 3) extending perpendicular to the sides 31 and 32 of the seat frame 21 and a second multiplicity of elastomeric filaments 62 extending perpendicularly of the front and rear sides 33 and 34 of the seat frame 21. As best shown in FIG. 3, the elastomeric filaments 60, 62 are interlaced or interwoven to form a woven mat. The woven mat or seat cushion 16 at its opposite end or side portions are folded over, as best shown in FIG. 4, and adhesively bonded to the underside of the cushion 16 to define loops 65 having openings 65a for receiving elongated members or rods 66 therethrough. The rods 66 extend for the entire length of each side portion of the seat cushion 16 and comprise two or four in number for each cushion 16.

The seat cushion 16 is adapted to be prestretched a predetermined amount both sideways between the sides 31 and 32 of the seat frame section 21 and lengthwise between the sides 33 and 34 of the seat frame section 21 and then attached to the upper frame section 21 via a plurality of hooks 70 each having one end 71 encircling a rod 66 and the other end 72 in the shape of a hook which is received in holes 74 in the upper seat frame 21. Thus, the seat cushion 16 is securely attached to the upper frame section 21 of seat frame 12.

Likewise, the backrest cushion 18 is constructed in the same manner as the seat cushion 16 and is secured to the back rest frame 14 in the same manner as the seat cushion 16 is secured to the upper frame section 21 of seat frame 12.

The elastomeric filaments 60, 62 are comprised of a block copolymer of: polytetramethylene terephthalate polyester and poly (tetrametalmethylene ether). This material is a combination of hard crystalline segments of the polyester and soft amorphous segments of the poly ether. Annealing the filaments at a specific temperature while they are stretched orients the polyester molecules in one direction while leaving the poly ether molecules unaffected. This increases the material stiffness and more than triples its strength. An example of such a material is Hytrel, a registered trademark of the E. I DuPont DeNemours Company and this material will be hereinafter referred to as Hytrel.

The oriented Hytrel filaments have a diameter between 0.05 and 2 millimeters, but preferably are approximately 0.5 millimeters in diameter. The Hytrel filaments 60, 62 of the woven seat cushion 16 when attached to the seat frame 21 are preferably prestretched between 10 and 20% elongation, if prestretched in both perpendicular directions, or prestretched between 20 and 35% elongation if stretched in only one direction, to provide a feeling of softness and good support.

Oriented Hytrel has at least five times the modulus of elasticity of ordinary or natural rubber. Moreover, the stress strain curve for Hytrel tends to plateau in the range of strain between 5 and 40% elongation. Thus, filaments prestretched in this range will provide good comfort and will easily deflect to adjust to the shape of the occupant. However, with a sudden change of stress, it will stiffen at strains above 40% and support the additional load. If the filaments 60, 62 of the woven mat 16 are stretched in two directions normal to each other, the amount of prestretch can be only 5% elongation in each direction to provide good support.

As for the backrest woven mat or cushion 18, the same prestretch as in the seat cushion 16 will provide for good comfort and support.

It has also been found that the load deflection curve for the woven mat 16 has relatively the same shape as that of single side by side filaments, the deflection curve for the latter being shown in the aforementioned U.S. Pat. No. 4,545,614, which is assigned to the same assignee as the present invention. The woven mat structure 16, however, exhibits lower modulus and has higher elongation or strain at a given load than the single side by side filaments. This is attributed to the fact that the weave structure is somewhat loose and is able to undergo some elongation by change in the weave angle and straightening of the filaments before any elastic stretching takes place. The desirable relatively flat area in the stress strain curve at lower strain levels is also present in the woven mat structure and thus, a mat prestretched into this flat area will feel comfortable.

It has also been found that in the woven mat 16 for the seat cushion, good comfort and results are obtained if the weave density is 8 filaments per centimeter in both directions. In the case of the backrest cushion, a lesser number of filaments per centimeter may be used, if desired.

It is also been found that with the use of oriented Hytrel filaments 60, 62, the stress strain measurements thereof show that they have good hysteresis—that is, the stress at a given strain during stretching was much higher than during release of stress. This is desirable because it means that much of the energy absorbed during stretching is dissipated and not regained when the filament is relaxed. This results in better dampening of impacts due to rough road surfaces.

It should also be apparent from the above noted construction, that the use of the Hytrel woven mat is both very comfortable and provides a seat assembly which has good dampening characteristics and which is very thin when compared to conventional car seats of the foam cushion type.

As noted hereinbefore, the woven seat cushion or back rest 16, 18 are readily attached to the frame means 10 by hooks 70 extending around rods 66 disposed within the loops 65 that are defined by folded side portions of the seat cushion 16. Also as noted before, the folds are held in place by an adhesive means. Preferably, the folds are kept in place by a novel hot melt adhesive 75 placed between the two layers of the folded mat which forms the loop 65 and are hot pressed to form a bond. The softening point of the hot melt adhesive is extremely critical. It cannot be to low, otherwise the adhesive will lose strength at high use temperatures, or too high, otherwise an appreciable degree of shrinkage of the oriented Hytrel filaments will occur during melt pressing of the adhesive. For this reason, it is necessary to use a hot melt adhesive having the right melting or softening point and a high modulus tensile strength. In the preferred embodiment, the adhesive consists of 90% by weight methacrylic ionomer partially neutralized by sodium, such as that sold under the trade name Surlyn 8940, made by the E. I. DuPont DeNemours Company, and 10% by weight ethylenevinylacetate, such as that sold under the trade name Vynathene EY904, made by U.S. Chemical.

From the foregoing comments, it should be apparent that a novel seat assembly has been provided which is thin, gives good comfort, is of less weight than conventional foam seats and which has a high strength and provides good hysteresis characteristics.

Although the illustrated embodiment hereof has been described in great detail, it should be apparent that certain modifications, changes and adaptations be made in the illustrated embodiment and that it is intended to cover all such modifications, changes and adaptations which come within the spirit of the present invention.

The embodiments of the invention in which an exclusive property or privilege is claimed are defined as follows:

1. A vehicle seat assembly comprising:

frame means including a seat frame having laterally spaced generally horizontal side frame portions and laterally spaced generally horizontal front and rear frame portions for supporting a seat and a back rest frame having laterally spaced, generally vertically extending side frame portions and generally horizontal top and bottom frame portions for supporting a back rest, said seat and backrest each comprising a woven mat having first and second multiplicities of individual closely spaced side-by-side located elastomeric filaments extending perpendicular to each other and with each filament having a diameter between 0.025 to 2.0 millimeters whereby said seat and backrest are very thin, said first and second multiplicities of elastomeric filaments being slidable relative to each other and not bonded to each other, said mats being folded over along their side portions and adhesively bonded to one side of the mat to define loops for receiving elongated members therethrough, said elastomeric filaments being made from a block copolymer consisting of polytetramethylene terephthalate polyester and polytetramethylene ether, said elastomeric filaments having a modulus of elasticity at 100 percent elongation which is at least five times more than natural rubber, said first and second multiplicities of elastomeric filaments being prestretched between 5 and 20 percent elongation prior to attachment to said side frame means, and means connectable with said elongated members for respectively securing the prestretched seat and backrest woven mats to adjacent portions of said seat and backrest frames of said frame means.

2. A vehicle seat assembly comprising:

frame means including a seat frame having laterally spaced generally horizontal side frame portions and laterally spaced generally horizontal front and rear frame portions for supporting a seat and a back rest frame having laterally spaced, generally vertically extending side frame portions and generally horizontal top and bottom frame portions for supporting a back rest, said seat and backrest each comprising a woven mat having first and second multiplicities of individual closely spaced side-by-side located elastomeric filaments extending perpendicular to each other and with each filament having an approximately diameter of 0.5 millimeters whereby said seat and backrest are very thin, said first and second multiplicities of elastomeric filaments being slidable relative to each other and not bonded to each other, said mats being folded over along their side portions and adhesively bonded to one side of the mat to define loops for receiving elongated members therethrough, said elastomeric filaments being made from a block copolymer consisting of polytetramethylene terephthalate polyester and polytetramethylene ether, said elastomeric filaments having a modulus of elasticity at 100 percent elongation which is at least five times more than natural rubber, at least one of said multiplicities of elastomeric filaments being prestretched between 10 and 20 percent elongation prior to attachment to said side frame means, an means connectable with said elongated members for respectively securing the prestretched seat and backrest woven mats to adjacent portions of said seat and backrest frames of said frame means.

3. A vehicle seat assembly comprising:

frame means including a seat frame having laterally spaced generally horizontal side frame portions and laterally spaced generally horizontal front and rear frame portions for supporting a seat and a back rest frame having laterally spaced, generally vertically extending side frame portions and generally horizontal top and bottom frame portions for supporting a back rest, said seat and backrest each comprising a woven mat having first and second multiplicities of individual side-by-side located elastomeric filaments extending perpendicular to each other and with each filament having an approximate diameter of 0.5 millimeters whereby said seat and backrest are very thin, said first and second multiplicities of elastomeric filaments being slidable relative to each other and not bonded to each other, said mats being folded over along their side portions to provide double thickness side portions, said woven seat mat having a weave density in both directions of eight filaments per centimeter, hot melt adhesive means comprising a blend of ethylene vinyl acetate and ethylene methacrylic acid ionomer for bonding the folded over side portions at their free ends to one side of said woven mats to define loops for receiving elongated members therethrough, said elastomeric filaments being made from a block copolymer consisting of polytetramethylene terephthalate polyester and polytetramethylene ether, said elastomeric filaments having a modulus of elasticity at 100 percent elongation which is at least five times more than natural rubber, at least one of said multiplicities of elastomeric filaments being prestretched between 10 and 20 percent elongation prior to attachment to said side frame means, and means connectable with said elongated members for respectively securing the prestretched seat and backrest woven mats to adjacent portions of said seat and backrest frames of said frame means.

* * * * *